Aug. 13, 1968  D. I. GREGOROVIC  3,396,930
SUPPORT PENETRATING BRACKET
Filed Nov. 22, 1965  2 Sheets-Sheet 1

INVENTOR
DRAGUTIN IVAN GREGOROVIC

BY *Imirie & Smiley*

ATTORNEYS

Aug. 13, 1968     D. I. GREGOROVIC     3,396,930
SUPPORT PENETRATING BRACKET

Filed Nov. 22, 1965     2 Sheets-Sheet 2

INVENTOR
DRAGUTIN IVAN GREGOROVIC

BY *Jminnie & Smiley*

ATTORNEYS

United States Patent Office 3,396,930
Patented Aug. 13, 1968

3,396,930
SUPPORT PENETRATING BRACKET
Dragutin Ivan Gregorovic, 1 Quai Marcellis,
Liege, Belgium
Filed Nov. 22, 1965, Ser. No. 509,093
Claims priority, application Belgium, Nov. 30, 1964,
656,476
11 Claims. (Cl. 248—216)

ABSTRACT OF THE DISCLOSURE

A supporting device adapted to be received in a wall recess or the like comprising a slit tube having a line of perforations diametrically opposed to the slit and thereby simultaneously imparting a greater degree of elasticity to the tube and providing edge portions to increase the holding effect of the tube within the recess.

---

It is well-known that the fixing on walls, beams, columns and other building parts, of various accessories and appliances, such as central-heating radiators, piping and pipe connections, shelving, the guides of lifts or elevators, and other common objects, creates problems which are sometimes complex and which are generally costly to solve.

The securing in place of supporting or fixing devices is normally effected either by forming a cavity, more or less large, in which the device is inserted and sealed; or, by securing the device by means of screws or spikes engaged in plugs driven into suitable holes formed by a drilling or other method.

These methods are long and costly; moreover, with the first method, after the support has been secured in place, it is practically impossible to modify its lateral position with respect to a wall other than by again going through the sealing operation. Moreover, the systems which utilise plugs present the inconvenience of frequent deterioration of the plug the mechanical strength of which is relatively low.

The present invention proposes a new arrangement the cost of which is very much reduced; which is easy to set in place; which has a very great resistance to being pulled away; and which can, however, be removed and replaced in position at will. It only needs the simple drilling of a suitable hole in the supporting part.

The arrangement consists essentially of a split tube formed from a strip of sheet metal or other suitable material bent to shape and in which are formed gaps and perforations designed to give to it a certain elasticity, and also to increase the holding effect in a wall or other support. This tube can have a section which is circular, oval, triangular or of any generally polygonal shape, whether symmetrical or not.

The end of the tube which is to be engaged in the hole in the support is made slightly conical in order to facilitate the engagement operation; whilst the end which is intended for supporting or fixing the article concerned is conditioned in any manner appropriate to the intended function and/or to the shape of the article.

In order better to explain what has been set out above, the accompanying drawings represent, by way of example and in a non-limitative manner, methods of carrying out the supporting and fixing arrangements according to the invention.

Thus, FIGURE 1 is a plan view of the developed blank from which the device is fashioned.

Figure 1:
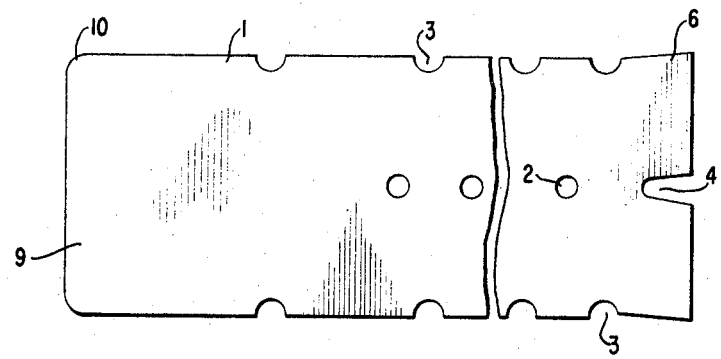
Figure 2:
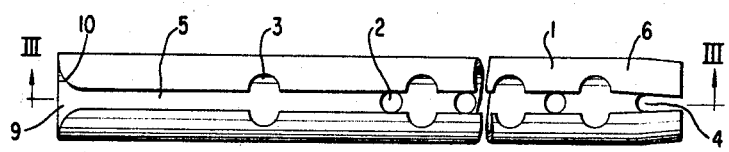
FIGURE 2 is a longitudinal side view of the fashioned tube which is shown, by way of example, as being of circular section.
Figure 3:
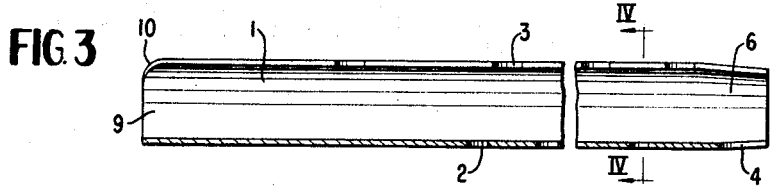
FIGURE 3 is a longitudinal section on line III——III, FIGURE 2.
Figure 4:
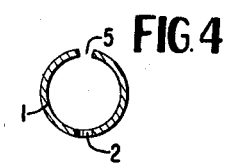
FIGURE 4 is a section on line IV—IV, FIGURE 3.
Figure 5:
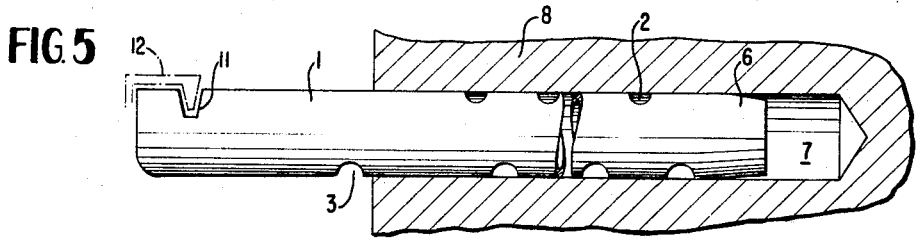
FIGURE 5 shows the device introduced into its housing, as well as one form of its supporting end.

Referring to FIGURES 1 to 5 of the above figures, the tube 1 is formed from a flat blank of sheet iron, steel or other convenient metal, or even of a synthetic material, folded on itself by a curling operation. It has perforations 2 arranged in one or several rows parallel to its longitudinal edges in which are formed notches 3 of round or polygonal shape. It also has one or more gaps 4 in its rear end. The opposite edges of the blank when curled up into tubular form, are not in contact but remain separated by a slot 5 of some millimetres in width. The corners 10 are rounded in order to avoid sharp and dangerous angles. The perforations 2 are provided for giving a certain elasticity to the blank 1. The notches 3, which present sharp corners, ensure a better holding of the tube in its housing (FIGURE 5).

The end 6 of the tube intended to engage in the housing 7 formed in the wall 8 or the like, is slightly chamfered in order to facilitate its insertion. The easy forming of this chamfered part is facilitated by the one or more notches 4.

The other end 9 of the tube, and which is intended to function for the support or fixing of the object to be held, can take various forms as, for example, those of FIGURES 5 to 15.

In the first very simple embodiment (FIGURE 5) a horizontal slot or notch 11 permits of the introduction of a hook or bracket 12 forming part of the structure of the article to be fixed or suspended.

Figure 6:
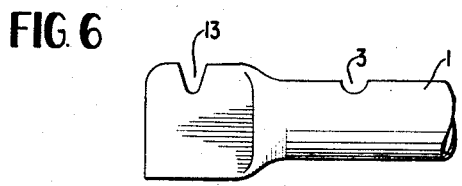
FIGURES 6 and 7 represent, in side view and plan, another manner of forming the supporting end.
Figure 7:
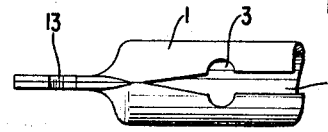

FIGURE 6 and 7 represent a similar arrangement in which the end of the tube has been flattened so as to present a narrower section as may be desired. A notch 13 is provided in it.

Figure 8:
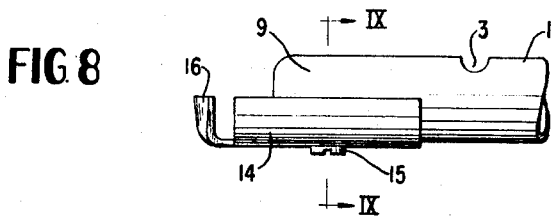
FIGURES 8 and 9 represent, in side view and cross-section, a modification in which a separate supporting member is added.
Figure 9:

In the embodiment of FIGURES 8 and 9, a member 14 of sheet metal or other suitable material, fashioned to an arcuate section so as to mate with the exterior surface of tube 1, fits like a cap the lower part of the end 9 on which it is fixed by means of one or more screws 15, or by soldering or other like means. The member 14 terminates in a bracket 16 forming an anchorage hook.

Figure 10:
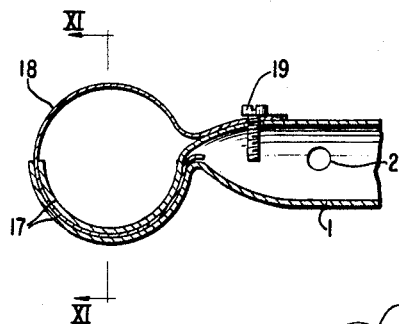
FIGURES 10 and 11 show, in longitudinal and transverse section respectively, a modification of the manner in which the end of the tube is fashioned, and with the addition of a thin plate so as to form a collar or sleeve.
Figure 11:
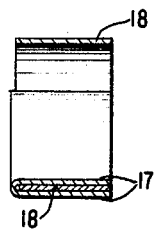

FIGURES 10 and 11 show the end of the tube pressed and arched in the form of a channel 17 of dimensions suitable for the diameter of a tube to be supported. A thin plate 18 in sheet metal is in part held by being clamped between the walls of the tube, but it is extended in a manner to form a ring of which the lower half is formed by the channel 17. Its end is fixed to the tube, for example, by means of a screw 19.

Figure 12:
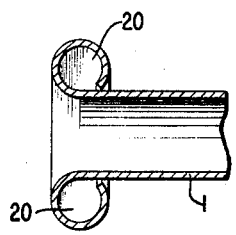
FIGURE 12 shows, in section, a form in which the outer end of the tube is in the form of two sleeves.

FIGURE 12 shows an embodiment in which the outer end is first divided into two parts by sawing the wall at the side opposite to the longitudinal slot, each of the two parts then being curled on itself in order to form a sleeve 20 for receiving a tube or the like.

Figure 13:
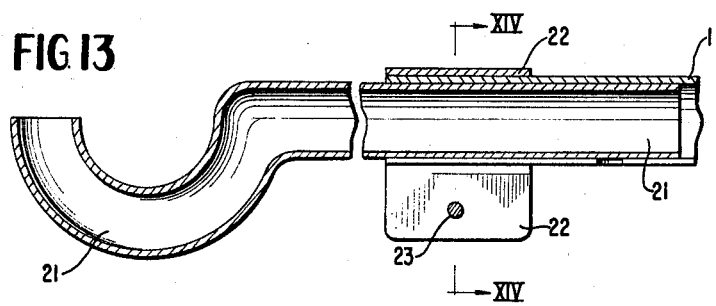
FIGURES 13 and 14 show, in longitudinal and transverse section, the fitting, by insertion and clamping, of a hook-type supporting member to the device.
Figure 14:
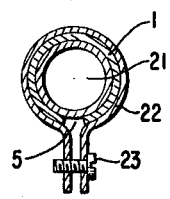
Figure 15:
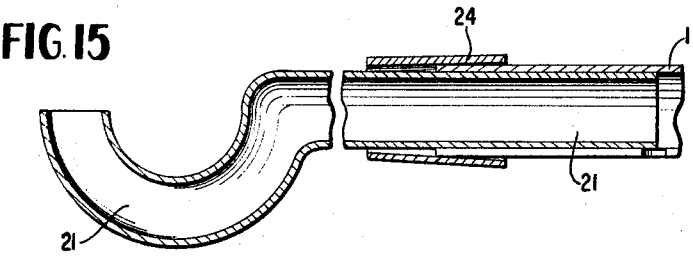
FIGURE 15 is a modification of the form shown in FIGURES 13 and 14.

In the form shown in FIGURES 13 and 14, a piece 21, of tubular form for example, and fashioned in the form of a hook, terminates in a straight shank part which is engaged in the tube 1 and is there retained by clamping it by means of a clip 22 having clamping screw 23.

In the modification of FIGURE 16, a clamping collar is in the form of a conical sleeve 24 which is driven on to the end of the tube. The fitting of the device is very simple; it is sufficient to introduce it into the hole 7 (FIGURE 5) drilled in the wall or other support 8, with an interior diameter slightly less than the exterior diameter of the tube 1 in order to effect a fixing. If necessary, the tube 1 can be held between the jaws of a clamp in a manner such that the diameter is slightly reduced by closing in the sides of the slot. When freed it will expand by its elasticity and strongly grip the walls of the hole 7. This same pinching operation allows of easily removing the device from the hole or of sliding it in order to adjust, as desired, the length of the projecting portion. This possibility constitutes one of the essential advantages of the invention which, moreover, permits, as described, of utilising the same basic element, namely, the slotted tube, in a great variety of supporting arrangements, by a suitable formation of its end.

It is obvious that other embodiments can be envisaged without departing from the scope of the invention as characterised by the claims.

I claim:
1. A device for supporting piping, radiators, shelving and other articles by insertion into a wall, column or other supporting part, comprising
   a longitudinally slit tube fashioned from a blank of sheet material bent up into tubular form,
   one end of the tube being slightly conical for easy insertion of the supporting part and the other end being formed for holding an article to be supported,
   said tube being provided with a line of perforations substantially diametrically opposed to said slit and extending generally parallel thereto, said perforations presenting edges surrounding same for anchoring engagement with the supporting part and also presenting a weakened line imparting elasticity to the tube.
2. The device according to claim 1 wherein said one end of the tube is provided with a notch whereby said conical deformation thereof is allowed.
3. A device according to claim 1, wherein the opposed edges of the longitudinal split in the tube are formed with recesses.
4. A device according to claim 3, wherein the recesses in the edges of the split are of semi-circular shape with sharp corners.

5. A device according to claim 1, wherein the insertion end of the tube is formed with at least one gap.
6. A device according to claim 1, wherein the outer supporting end of the tube is provided with a transverse recess for receiving an article to be supported.
7. A device according to claim 1, wherein the outer supporting end of the tube is flattened and a notch is provided in the flattened part for receiving an article to be supported.
8. A device according to claim 1, wherein the outer end of the tube carries a separate supporting member shaped in cross-section to correspond to the cross-section of the tube to which it is applied and secured by screw means, said separate supporting member being shaped to support an article.
9. A device according to claim 1, wherein the outer supporting end of the split tube is divided at the side opposite to the split, and the divided portions curled over to form sleeves.
10. A device according to claim 1, wherein the supporting end of the tube carries an article-supporting member of hook form and having a shank portion that is inserted into the tube and is adjustably held therein by clamping means.
11. A device for supporting piping, radiators, shelving and other articles by insertion into a wall, column or other supporting part, characterised in that it comprises a longitudinally split tube fashioned from a blank sheet material bent up into tubular form, one of the ends of said tube being slightly conical for easy insertion into a preformed housing in the wall or other supporting part, and the other end being formed for holding an article to be supported, the outer supporting end of the tube being pressed to a transverse channel form with a separate plate between the walls of the pressed channel, said plate being extended to form with the channel a sleeve part for surrounding an article and the free end of the extension being fixed to the top of the tube.

References Cited
UNITED STATES PATENTS

| 727,111 | 5/1903 | Duffy | 248—71 |
| 1,022,121 | 4/1912 | Boyland | 248—216 |
| 1,782,131 | 11/1930 | Broberg | 248—267 |
| 2,913,204 | 11/1959 | Stewart | 248—71 |

FOREIGN PATENTS 1,101,988  10/1959  France.

ROY D. FRAZIER, *Primary Examiner.*

J. F. FOSS, *Assistant Examiner.*